March 16, 1937.    E. J. VON PEIN ET AL    2,074,005
DROP WEIGHT SCALE
Filed Dec. 12, 1935    3 Sheets-Sheet 1

March 16, 1937.  E. J. VON PEIN ET AL  2,074,005

DROP WEIGHT SCALE

Filed Dec. 12, 1935   3 Sheets-Sheet 2

INVENTORS
Edward J. Von Pein
Paul J. Schlesinger
BY
W. M. Wilson
ATTORNEY

March 16, 1937.　　E. J. VON PEIN ET AL　　2,074,005
DROP WEIGHT SCALE
Filed Dec. 12, 1935　　3 Sheets-Sheet 3

INVENTORS
Edward J. Von Pein
Paul J. Schlesinger
BY
W. M. Wilson
ATTORNEY

Patented Mar. 16, 1937

2,074,005

UNITED STATES PATENT OFFICE 2,074,005

DROP WEIGHT SCALE

Edward J. Von Pein and Paul J. Schlessiger, Endicott, N. Y., assignors to International Business Machines Corporation, New York, N. Y., a corporation of New York Application December 12, 1935, Serial No. 54,002

15 Claims. (Cl. 265—48)

This case relates to weighing scales, particularly to capacity weight counterbalancing means for supplementing automatic counterbalancing means.

The object of the invention is to provide novel means for applying the capacity weights singly.

More specifically, an object is to provide an impositive rotary drive for causing application of a capacity weight.

Another object is to provide a manual release mechanism which upon each operation, no matter how prolonged, releases a rotary drive for one single revolution only, to cause application of a single capacity weight.

Still another object is to provide novel resetting or restoring means for the capacity weight applying means.

Other objects will appear from the further parts of the specification and from the drawings, in which.

Figure 1:
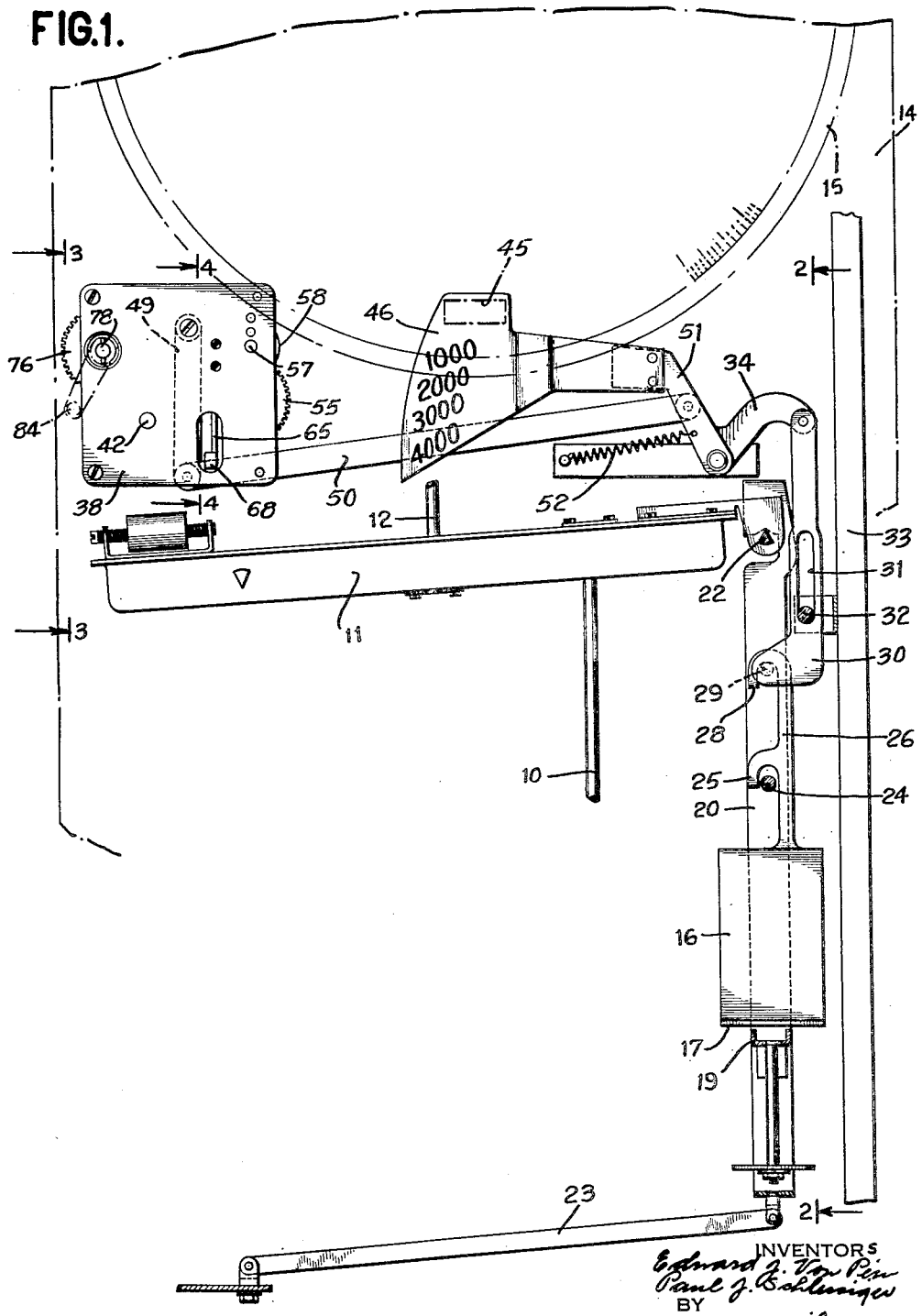
Fig. 1 is a front view of the capacity or drop weight portion of the scale.

The capacity weight counterbalancing mechanism preferably supplements an automatic counterbalancing mechanism which includes draft rod 10, through which the load is applied to intermediate beam 11 (see Fig. 1). The beam transmits the load force through a link 12 to an automatic load counterbalancing and indicating system (not shown).

The scale frame 14 carries the usual dial 15 having indications for coacting with the pointer (not shown) to indicate the automatically counterbalanced load.

When the automatic capacity of the scale is exceeded, one or more of four drop weights 16 is applied to the intermediate beam 11 to oppose the load.

Figure 2:
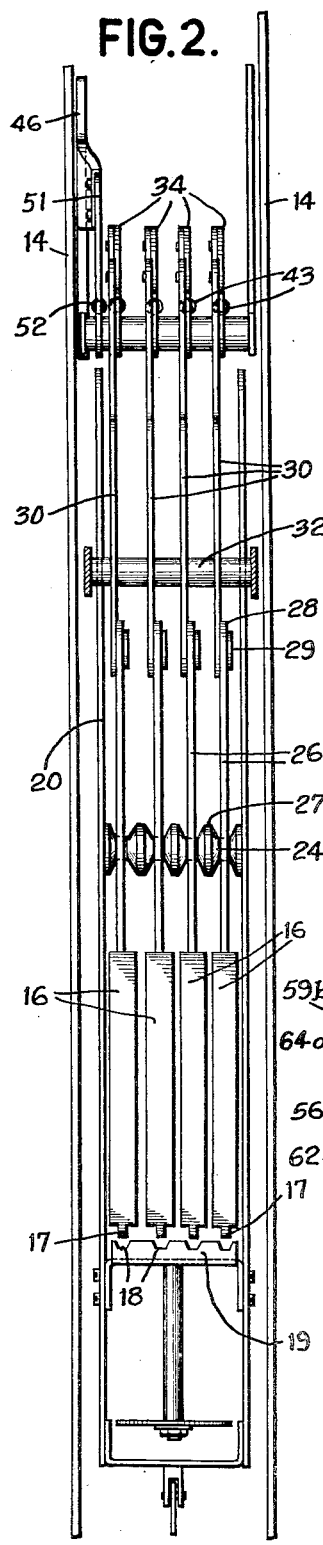
Fig. 2 is a section along lines 2—2 of Fig. 1.

The drop weights are each designed to counterbalance a load of 1000 lbs. As indicated in Figs. 1 and 2, each of the drop weights is formed at the bottom with a narrow rib 17 adapted to engage the base of a tapered notch 18 formed in a horizontal strap 19 which is fastened at opposite sides to the sides of a cage 20. The cage 20 is supported, at its upper end, by a knife edge 22 fixed in the right end of beam 11, and at its lower end the cage is pivoted to a check link 23 which combines with lever 11 to restrict cage 20 to vertical movement parallel to itself.

In addition to supporting drop weights 16 by strap 19, cage 20 also has a cross rod 24 on which hooks 25 of the integral stems 26 of weights 16 rest when the drop weights are lowered. Rod 24 is formed between stems 26 of the drop weights with enlarged knob portions 27 which guide the drop weights for vertical, rectilinear movement. When a drop weight is lowered, it is supported by strap 19 and rod 24 of cage 20 and, through the cage, the weight is applied to beam 11 to oppose the force of the load.

The upper end of each weight stem is formed as a hook 28 to engage over a pin 29 carried by the lower end of a link 30 which has an elongated, vertical, slot 31 receiving a rod 32 secured to frame standard 33. Each link 30 is suspended from the right end of one of four bell cranks 34 and is constrained by rod 32 to substantially vertical rectilinear movement.

Each bell crank 34 is connected by a link 35 (see Figs. 3 and 5) to an arm 36 pivotally suspended from a rod 37 fixed between the front and rear plates 38 and 38', respectively, of a subframe attached to main scale frame 14.

Each pivoted arm 36 carries a roller 39 (see Figs. 3 and 6) for engaging the periphery of a different cam 40. The four cams 40 are pinned to a common shaft 42 journaled in the front and back plates 38 and 38'. In initial, zero capacity weight position, each cam 40 has its low portion opposite the follower roller 39 of the associated link 36. A spring 43 (see Fig. 2) acting on each bell crank 34 urges the bell crank counterclockwise (Fig. 1) to force link 35 to the left and to hold link 30 and the drop weight 16, carried thereby, raised. As link 35 is urged to the left, it causes follower roller 39 of the connected link 36 to maintain engagement with the associated cam 40. When all the cams 40 have their low portions opposite follower rollers 39, the drop weights 16 are thus held in elevated position by the force of springs 43. None of the drop weights are then acting on beam 11 and the capacity weight counterbalancing effect is zero.

The spring 43 acting through each bell crank 34 exerts just enough force to overcome by a bare minimum the gravitational force of the associated drop weight. Therefore, a follower roller 39 presses only lightly against the periphery of its cam 40 when the associated drop weight is in elevated position and opposing the pressure of spring 43 so that the resistance of the follower roller 39 to rotation of its cam 40 is reduced to a minimum and consequently the force required to turn shaft 42 of cams 40 and to lower weights 16 for application to beam 11 is also a minimum.

Cams 40 are intended to act successively on the drop weights 16. Accordingly, the rise of each cam is offset from the rise of the next cam by an angle of 72° or one-fifth of a full turn of shaft 42. During the first fifth of a revolution of shaft 42 clockwise (Fig. 5), the rise of one cam will act on a follower roller 39 to rock pivoted arm 36 counterclockwise, which through link 35 rocks the connected bell crank 34 clockwise. As the bell crank rocks clockwise, it lowers the connected vertical link 30 and the weight 16 supported by pin 29 of the link. The weight 16, as it descends, engages strap 19 and rod 24 of cage 20 and stops moving down relative to the cage while link 30 continues its descent and its pin 29 releases hook 28 of weight stem 26. Thus, the first fifth of a revolution of shaft 42 applies one drop weight 16 to the beam to counterbalance 1000 lbs. of load.

During the second fifth of a revolution, the rise of another cam will act on coacting follower roller 39 to cause another drop weight 16 to be applied to beam 11.

In above manner, the first, second, third, and fourth fifths of a turn of shaft 42 will successively apply the four drop weights 16 to beam 11 to counterbalance 1000 to 4000 lbs.

To indicate the capacity counterbalancing force in effect, the indicating dial 15 (see Fig. 1) has a sight opening 45 behind which is an indicating flag 46 with successive 1000, 2000, 3000 and 4000 indications. Initially, an unmarked portion of flag 46 is at sight opening 45. As successive drop weights 16 are applied, flag 46 will rise to successively expose through opening 45 the indications 1000, 2000, etc.

To operate flag 45, shaft 42 rigidly carries a cam 47 (see Figs. 3, 5, and 6) engaged by a follower roller 48 carried by an arm 49 pivotally suspended from rod 37. The lower end of arm 49 is connected by a link 50 to a pivoted arm 51 rigidly carrying capacity indicator flag 46 (see Fig. 1). A spring 52 urges arm 51 counterclockwise (Fig. 1) to hold flag 46 in lower position with its blank portion exposed through sight opening 45. As arm 51 is urged counterclockwise, it acts through link 50 to hold follower roller 48 of arm 49 against the periphery of cam 47.

Cam 47 has a contour progressively increasing in radius in accordance with the successive rises of cams 40. In the initial, zero capacity position of the parts, the low portion of cam 47 is engaged with follower 48. As shaft 42 is turned to cause cams 40 to successively apply the four weights 16 to beam 11, the cam 47 progressively moves follower roller 48 and its arm 49 towards the right. As arm 49 moves to the right, through link 50, it rocks arm 51 and flag 46 clockwise. The rise of cam 49 is so proportioned that upon the first, second, third, and fourth fifths of a turn of shaft 42, flag 46 will be raised to successively expose 1000, 2000, 3000, and 4000 through sight opening 45. Since these successive increments of movement of shaft 42 also apply the four weights 16, in succession, to beam 11, it is evident that flag 46 will indicate the counterbalancing effect of the applied weights.

After the rise of a cam 40 has acted on a follower 39, a high dwell portion of the cam engages the follower for the remainder of the four-fifths of a revolution which shaft 42 is permitted to make; so that once a weight 16 has been applied to beam 11, it remains in effect for the rest of the partial revolution of shaft 42.

Shaft 42 rigidly carries a gear 52. When shaft 42 has rotated four-fifths of a turn clockwise, a stud 53 on the gear strikes a stop pin 54 (see Figs. 5 and 6) extending from back plate 38' and stops further clockwise rotation of the shaft.

Figure 4:
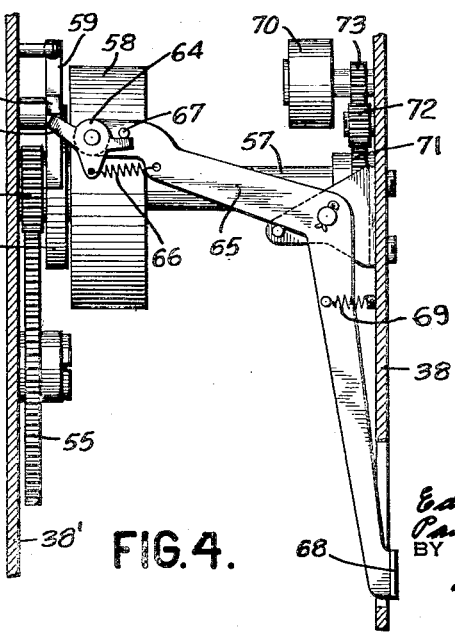
Fig. 4 is a section along lines 4—4 of Fig. 1.
Figure 5:
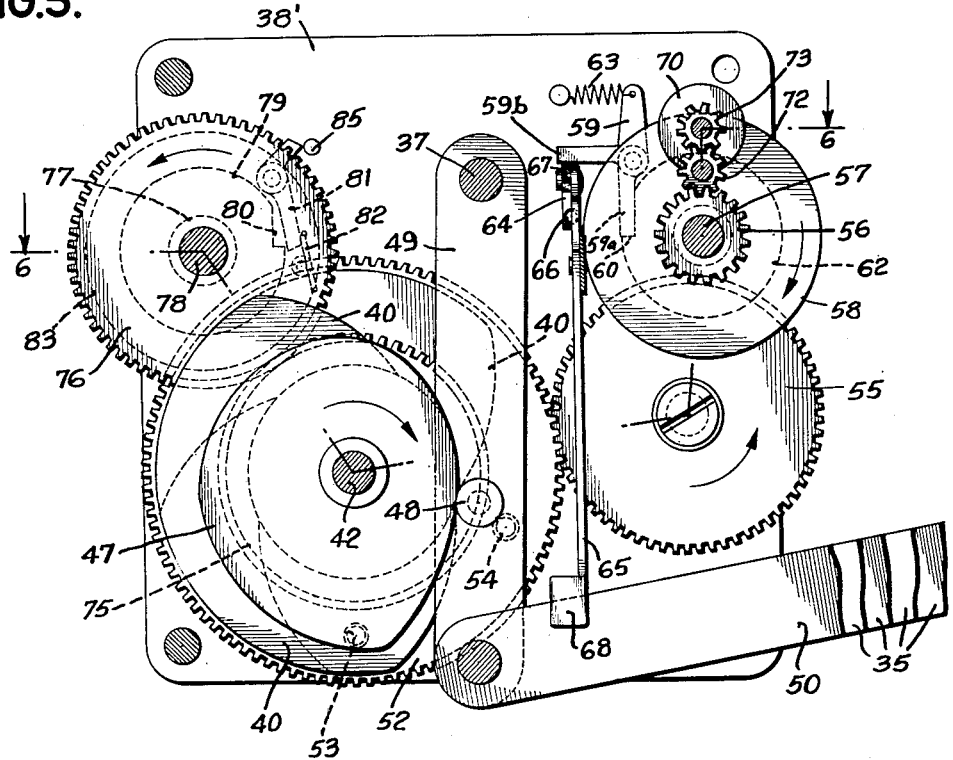
Fig. 5 is a section along lines 5—5 of Fig. 3.
Figure 6:
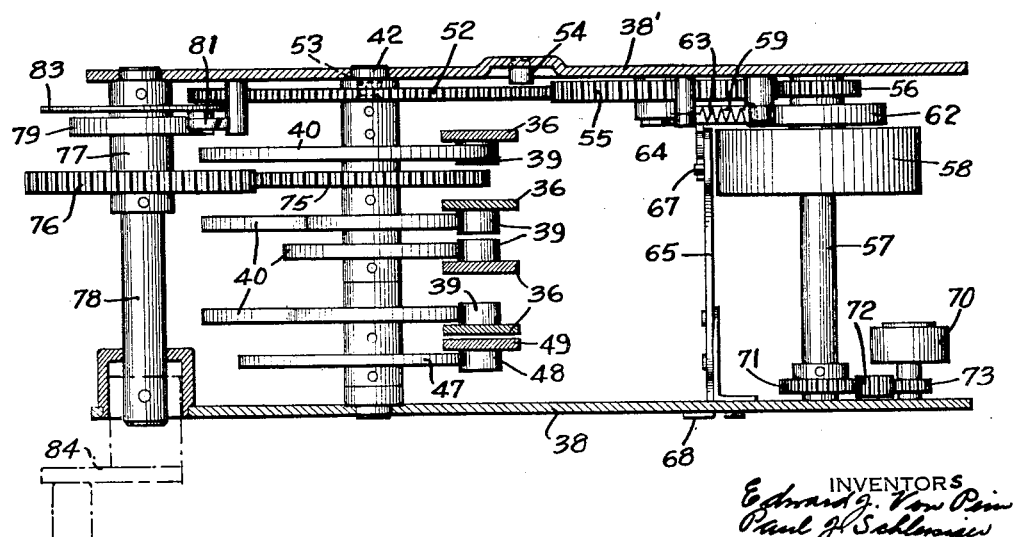
Fig. 6 is a section along lines 6—6 of Fig. 5.

Gear 52 meshes with a gear 55 which is meshed with a pinion 56 on a shaft 57 (see Figs. 4, 5, and 6). Shaft 57 is urged clockwise by a drum spring motor 58. Normally, shaft 57 is restrained from clockwise rotation by engagement of the nose end of a pawl 59 with the base of a notch 60 in a one-revolution clutch disk 62 fixed to shaft 57. A spring 63 biases pawl 59 anticlockwise to maintain its nose end engaged with clutch disk 62.

Pawl 59 has a horizontally extending arm 59b engaged at the bottom by arm 64a of a by-pass dog 64. The dog is pivotally carried by the horizontally disposed arm of a bell crank lever 65 and urged by a spring 66 to engage its tail with a stop pin 67 on the lever. The lower end of lever 65 is formed with a tab portion 68 extending through a hole in front plate 38 and exposed through a similar hole in scale frame 14 to be accessible to the operator who presses on tab 68 to rock lever 65 clockwise against resistance of a spring 69.

When lever 65 is rocked clockwise, it raises dog 64 and arm 64a of the dog acts against the bottom of arm 59b of pawl 59 to rock the pawl clockwise against resistance of spring 63. The nose end of pawl 59 thereupon withdraws from notch 60 of clutch disk 62, permitting spring motor 58 to rotate shaft 57 clockwise.

While arm 65 rocks clockwise to effect release of pawl 59 from disk 62, the resisting pressure of pawl 59 exerted on arm 64a of dog 64 and the force of spring 66 combine to maintain the tail of the dog firmly against stop pin 67 of lever 65, thereby compelling the dog to move as a rigid part of lever 65.

As soon as dog 64 releases pawl 59 from disk 62, spring motor 58 starts rotating shaft 57 and its disk 62 clockwise. The dog holds pawl 59 released long enough to permit the notch 60 to pass the nose end of the pawl. Then, as lever 65 and the dog 64 continue to rock clockwise, the dog slides off to the right of arm 59b of the pawl, which is thereupon restored counterclockwise by its spring 63. By this time, the unbroken circular portion of disk 62 is opposite the nose end of the pawl so that for the remainder of the one revolution of disk 62, the pawl will ride on the circular portion of the disk. Near the end of the one revolution of disk 62, its notch 60 will again reach the nose end of pawl 59 and the latter will immediately be forced by spring 63 into the notch to engage the base of the notch to stop disk 62 when shaft 57 has completed its one revolution.

When the operator releases pressure on tab 68 of lever 65, spring 69 restores the lever counterclockwise. Pawl arm 59b being at this time below arm 64a of dog 64, the latter arm will strike arm 59b during counterclockwise movement of lever 65. Since pawl 59 is now engaged with the circular periphery of disk 62, it cannot rock further counterclockwise and arm 59b cannot move down. Therefore, during counterclockwise movement of lever 65, when arm 64a strikes the top of arm 59b, dog 64 is compelled by engagement with arm 59b to rock clockwise about its pivot, spring 66 yielding to permit this action of dog 64. The dog yields relative to lever 65 until it passes arm 59b of pawl 59, whereupon spring 66 snaps the dog back into contact with stop pin 67. Thus, dog 64 provides a momentary operating connection between lever 65 and pawl 59 during the forward, clockwise stroke of the lever and yields relative to the lever upon the return stroke of the lever in order to pass by the pawl and return to its initial position beneath arm 64b of the pawl.

Each time lever 65 is rocked by the operator, it effects release of disk 62 and its shaft 57 for one revolution clockwise by spring motor 58. Through gearing 56, 55, and 52, one revolution of shaft 57 effects one-fifth of a revolution of shaft 42 clockwise. As explained previously, each fifth of a revolution of shaft 42 applies one of weights 16 to beam 11. The operator must depress lever 65 four times to cause application of the four weights 16 to beam 11. A fifth depression of lever 65 will have no effect since after four revolutions of shaft 57 and the corresponding four-fifths of a revolution of shaft 42, pin 53 will be against stop pin 54.

In order to dampen the speed of rotation of shaft 57 and the parts driven thereby, a governor 70 is driven through gears 71, 72, and 73 from shaft 57.

After a weighing operation during which one or more of the four weights 16 has been applied to counteract part of the load, the applied weight or weights must be returned to inactive position. This is done by rotating shaft 42 counterclockwise. During the counterclockwise rotation of shaft 42, through gears 52, 55, and 56, shaft 57 is also rotated counterclockwise to rewind spring motor 58.

Figure 3:
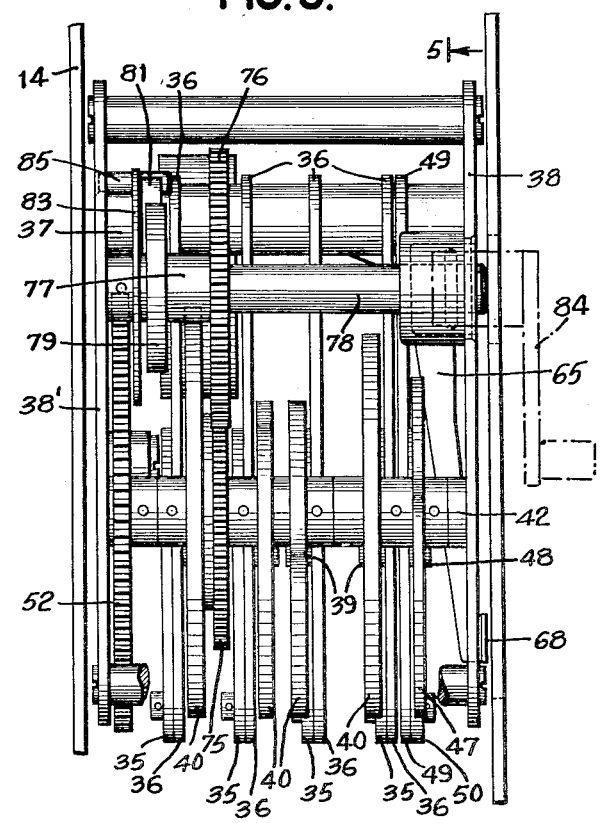
Fig. 3 is a section along lines 3—3 of Fig. 1.

To rotate shaft 42 counterclockwise, the following means are provided:

Shaft 42 has a gear 75 meshed with a gear 76 fast to a sleeve 77 rotatably carried by a shaft 78 (see Figs. 3, 5, and 6). Sleeve 77 rigidly carries a driven clutch disk 79 having a single notch 80 for receiving the nose of a clutch dog 81 urged towards the disk 79 by a spring 82. Dog 81 is pivotally carried by a driving disk 83 fast to shaft 78. The end of shaft 78 adjacent front plate 38 carries a crank handle 84. Through this handle, the operator rotates shaft 78 clockwise. During clockwise rotation of shaft 78, clutch dog 82 carried by disk 83, fast to the shaft, engages the base of notch 80 of clutch disk 79 to rotate the latter, its sleeve 77, and gear 76 on the sleeve clockwise. Gear 76, in turn, rotates gear 75 and cam shaft 42 counterclockwise to effect restoration of the drop weights; shaft 42 through gears 52, 55, and 56 simultaneously rotates shaft 57 to restore the power of spring motor 58.

Gears 75 and 76 are in one-to-one ratio. Accordingly, during application of drop weights 16 upon each fifth of a revolution clockwise of shaft 42, gear 76 will be rotated one-fifth of a revolution counterclockwise. Thus, starting from the initial position indicated in Fig. 5, gear 76, its sleeve 77, and driven clutch disk 79 will be rotated counterclockwise one to four fifths of a revolution depending on the number of drop weights applied to beam 11. After the maximum counterclockwise movement of four-fifths of a revolution, disk 79 will have its notch 80 slightly less than one-fifth of a turn below the nose end of restoring dog 81 when the latter is in the initial position, shown in Fig. 5. Thus, when shaft 78 is subsequently rotated clockwise, pawl 81 will move down substantially one-fifth of a revolution before it seats in notch 80 and couples disk 79 to shaft 78 for clockwise rotation. One revolution of shaft 78 in a clockwise direction will rotate sleeve 77 a maximum of four-fifths of a revolution (plus a slight overthrow) during which all the four drop weights 16 are restored, by springs 43, under control of cams 40.

During the clockwise revolution of shaft 78, it is restoring spring-driven shaft 57 in a counterclockwise direction. At the end of a single revolution of shaft 78, it will have caused a maximum of four counterclockwise turns of shaft 57 plus a slight overthrow movement. Thus notch 60 of clutch disk 62 on shaft 57 will have passed slightly beyond the lower end of arm 59a of pawl 59. At this time, the tail of clutch dog 81 of restoring disk 83 will strike a fixed stud 85 and thereby be rocked out of engagement with notch 80 of driven disk 79.

As a result, disk 79 is released for counterclockwise operation, and since notch 60 of disk 62 has passed slightly beyond pawl 59, spring motor 58 is permitted to rotate shaft 57 clockwise a slight amount before the base of notch 60 engages the pawl arm 59a. During this slight clockwise rotation of shaft 57, it effects a correspondingly slight counterclockwise movement of disk 79, causing the base of notch 80 of disk 79 to move above the nose of clutch dog 81. As a result, after one restoring revolution of shaft 78, its clutch dog 81 is automatically released from driven disk 79 and engaged with the unbroken circular periphery of disk 79, so that continued rotation of shaft 78 in a clockwise direction will not affect disk 69, cam shaft 40, or spring operated shaft 57.

*Summary*

Assume a load of 2300 lbs. to be applied to the scale and that the automatic capacity of the scale is 1000 lbs. Application of the load moves the load pointer (not shown) beyond the limit of indicating capacity of dial 15. The operator thereupon presses on finger tab 68 of lever 65 to rock the latter clockwise. Dog 64 carried by lever 65 rises and acts on the arm 59b of pawl 59 to rock the latter clockwise, releasing its nose end from notch 60 of clutch disk 62. As dog 64 rises, it passes arm 59b of the pawl which thereupon returns under the influence of spring 63 towards disk 62. The latter meanwhile has been moved clockwise by spring motor 58 so that notch 60 is above the nose end of pawl 59; the disk therefore continues its rotation to complete a single revolution before being stopped by engagement of the base of notch 60 with the nose end of pawl 59.

The clockwise revolution of disk 62 and its shaft 57, through gears 56, 55, and 52 drives shaft 42 for a fifth of a revolution, also clockwise, during which one cam 40 acts on a follower 39 to rock a pivoted arm 36 counterclockwise. As the arm 36 moves counterclockwise, through a link 35, it rocks a bell crank 34 clockwise, causing the latter to lower a weight supporting link 30. Descent of the latter drops a weight 16 onto supporting strap 19 and rod 24 of a cage 20 hung from beam 11. The weight 16 when applied to beam 11 offsets 1000 lbs. of the load. 1300 lbs. of the load still is acting on the automatic counterbalancing means, the latter is still beyond its indicating capacity, and therefore the operator depresses lever 65 again to cause another revolution of shaft 57 and a corresponding fifth of a revolution of shaft 42 to take place. During the second fifth of a turn of shaft 42 another cam 40 operates to effect application of a second drop weight 16 to the beam 11. The capacity counterbalance means will now be offsetting 2000 lbs.;

while the automatic counterbalance mechanism will be offsetting the remaining 300 lbs.

The indication 2000 will be given by flag 46 through sight opening 45 of dial 15.

After the weighing operation, the operator turns shaft 78 clockwise for one revolution. Starting from the position shown in Fig. 5, clutch dog 81 will pick up notch 80 of driven clutch disk 79 after shaft 78 makes slightly less than three-fifths of a revolution. For the remaining portion of the revolution of shaft 78, dog 81 will drive disk 79, its sleeve shaft 77 and gear 76 on the latter shaft, clockwise.

Gear 76 meshes with gear 75 on shaft 42 and drives the latter counterclockwise for two-fifths of a revolution, thus resetting the latter and its cams 40 in their initial position. During the resetting of cams 40, the two applied weights 16 are released from effect on beam 11. As shaft 42 is returned, through gears 52, 55, and 56, it rotates shaft 57 for two revolutions to re-energize spring motor 58.

It is to be understood that variations, changes, and modifications of the illustrated form of the invention may be made without departing from the teachings of the invention. It is therefore intended to be limited only in accordance with the scope of the appended claims.

What is claimed is as follows:

1. In a scale; a load responsive member, a plurality of weights, each to be applied to said member to offset a predetermined load, a weight applying mechanism, a device operable in steps, and upon each step causing said mechanism to apply one weight to said member, reciprocating means for initiating operation of said device, and means separate from and acting independently of the reciprocating means for restricting operation of said device to a single step upon each reciprocation of the initiating means.

2. In a scale; a load responsive member, a plurality of weights, each to be applied to said member to offset a predetermined load, a weight applying mechanism, a device operable in steps, and upon each step causing said mechanism to apply a single weight to said member, means movable from and back to a starting point for initiating operation of said device, and means separate from and acting independently of the initiating means, upon said device for restricting operation of said device to a single step upon each movement of the initiating means from and back to its starting point.

3. In a scale, a load responsive member, a plurality of weights, each to be applied to said member to offset a predetermined load, a weight applying mechanism, a device operable in steps, and upon each step causing said mechanism to apply a single weight to said member, restraining means for restraining operation of said device in a direction to apply weights, an instrumentality movable to a position for releasing the restraining means from effect on the device so as to initiate operation of said device, and means separate from and acting, independently of the aforesaid instrumentality, to restore said restraining means to effect upon said device for restricting operation of the device to a single step upon each movement of the aforesaid instrumentality to said position and regardless of the maintenance of said instrumentality in said position.

4. In a scale; a load responsive lever, a plurality of weights, each for application to the lever to offset a predetermined load, a weight-applying mechanism, a rotatable drive, means coacting with the drive and said mechanism for causing the latter to apply a single weight upon each revolution of said drive, a manual member having a limited movement for initiating rotation of the drive, and means restricting rotation of the drive to a single revolution upon each said movement of the member.

5. In a scale; a load responsive lever, a plurality of weights, each for application to the lever to offset a predetermined load, a weight-applying mechanism, an impositively driven shaft, a clutch disk carried by the shaft, a pawl coacting with the clutch disk to restrain rotation of the shaft, and a manually operable element movable in one direction to first engage and then pass by the pawl and by such action momentarily releasing the pawl from the disk to permit said shaft to be rotated to a limited extent such as to cause said mechanism to apply only a single weight to the lever.

6. In a scale; a load responsive lever, a plurality of capacity weights, each to be applied to said lever to offset a predetermined load, a shaft, mechanism operated by the shaft upon each revolution thereof for applying one weight to the lever, a spring motor for rotating the shaft, a one-revolution clutch disk carried by the shaft, a pawl for coacting with the disk to prevent rotation of the shaft by the spring motor, and means for momentarily releasing the pawl from the clutch disk to release the shaft for a single revolution by the spring motor, during which revolution said shaft operates the weight applying mechanism to apply a single weight to said lever.

7. In a scale; a load responsive lever, a plurality of capacity weights, each to be applied to said lever to offset a predetermined load, a shaft, a weight-applying mechanism operated by a single revolution of the shaft to apply one weight to the lever, a spring motor for rotating the shaft, a one-revolution disk on the shaft, a pawl coacting with the disk to restrain rotation of said shaft, a reciprocatable member, and means on said member for releasing the pawl from the disk to permit the shaft to make only one revolution upon each reciprocation of said member.

8. In a scale; a load responsive lever, a plurality of capacity weights, each for application to said lever to offset a predetermined load, a cyclically operable shaft, a weight-applying mechanism operated by the shaft to apply one weight upon each cycle of the shaft, and impositive drive for the shaft, a clutch disk on the shaft, a pawl coacting with the disk to restrain rotation of the shaft, a manually reciprocatable member, and a by-pass dog on the member coacting with the pawl upon each reciprocation of said member to momentarily release the pawl from the disk to permit one cycle of operation of the shaft for causing the said mechanism to apply one weight to the lever.

9. In a scale, a load responsive member, a plurality of capacity weights applied to the member to offset predetermined loads, means for removing the weights from effect on the member, a rotary actuator effective upon a single revolution to operate said means to remove the weights from effect on said member, and one-revolution clutch means for driving said actuator through one revolution and then automatically releasing said actuator.

10. In a scale, a load responsive member, a plurality of capacity weights applied to said member to offset predetermined loads, means for removing the weights from effect on the member, an actuator having a cycle of operation during which it operates said means to remove said weights from effect on the member, manual means for operating said actuator, and means for automatically releasing the manual means from the actuator when the latter has been operated through its cycle of operation.

11. In a scale, a load responsive member, a plurality of weights applied to said member to offset predetermined loads, means for removing the weights from effect on the member, a driven clutch device for operating said means, a driving clutch device coacting with the driven clutch device for operating the latter, and means other than and acting independently of the load responsive member for automatically stopping operation of the driven clutch device by the driving clutch device when the driven clutch device has been moved through a predetermined stroke.

12. In a scale, a load responsive member, a plurality of weights, mechanism movable in one direction to successively apply the weights to said member to offset predetermined loads and movable in a reverse direction to cause the weights to be removed from said member, a driven device connected to said mechanism to move in synchronism therewith, a driving device having a certain cycle of operation, coupling means between the two devices for picking up the driven device at different points of said cycle of operation depending on the number of weights which have been applied and thereafter actuating the driven device to move said mechanism in said reverse direction, and means for automatically rendering the coupling means ineffective when the applied weights have all been removed from the member.

13. In a scale, a load responsive lever, a plurality of capacity weights to be applied to said lever to offset predetermined loads, mechanism for applying the weights to and removing them from the lever including elements movable in one direction to cause application of the weights to the lever and movable in the reverse direction to cause the weights to be removed from said lever, a common shaft for said elements, a driven clutch device connected to said shaft, a driving clutch device, means for coupling the driving device to the driven device to move the latter and said shaft in a reverse direction to cause the elements to remove said weights from the lever, and means for rendering the coupling means ineffective to transmit operation of the driving device to the driven device upon continued operation of the driving device after the driven device has been restored to a predetermined position.

14. In a scale, a load responsive member, a plurality of weights to be applied to said member to offset predetermined loads, mechanism for applying the weights to and removing them from said member, a spring actuator for operating said mechanism to apply the weights to said member, and a restoring actuator for operating said mechanism to remove the weights from the member and to simultaneously store up energy in the spring actuator.

15. In a scale, a load responsive member, a weight to be applied to said member to offset a predetermined load, a cam, linkage including a cam follower for applying the weight to the member upon operation of said cam, and spring means connected to the linkage and acting thereon in opposition to the gravitational force of the weight to maintain the follower lightly pressed against the cam.

EDWARD J. VON PEIN.
PAUL J. SCHLESSIGER.